(12) United States Patent
Kwon

(10) Patent No.: US 9,154,323 B2
(45) Date of Patent: Oct. 6, 2015

(54) METHOD AND APPARATUS FOR WIRELESS COMMUNICATION USING BANDWIDTH-REQUEST PACKET

(75) Inventor: Chang-yeul Kwon, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1032 days.

(21) Appl. No.: 11/996,690

(22) PCT Filed: Aug. 24, 2007

(86) PCT No.: PCT/KR2007/004078
§ 371 (c)(1),
(2), (4) Date: Jan. 24, 2008

(87) PCT Pub. No.: WO2008/023957
PCT Pub. Date: Feb. 28, 2008

(65) Prior Publication Data
US 2010/0128679 A1    May 27, 2010

Related U.S. Application Data

(60) Provisional application No. 60/840,042, filed on Aug. 25, 2006.

(30) Foreign Application Priority Data

Aug. 21, 2007    (KR) .................. 10-2007-0084001

(51) Int. Cl.
*H04W 4/00*    (2009.01)
*H04L 12/28*    (2006.01)
(Continued)

(52) U.S. Cl.
CPC ............ *H04L 12/2838* (2013.01); *H04L 69/28* (2013.01); *H04W 72/0413* (2013.01); *H04L 2012/2841* (2013.01);
(Continued)

(58) Field of Classification Search
CPC ...................................................... H04W 72/04
USPC .................................. 370/329, 327, 330, 331
See application file for complete search history.

(56) References Cited

U.S. PATENT DOCUMENTS 5,706,048 A * 1/1998 Davis ............................... 725/62
6,870,808 B1 * 3/2005 Liu et al. ........................ 370/203
(Continued)

FOREIGN PATENT DOCUMENTS

EP    1 478 135 A1    11/2004
KR    10-0544481 B1    1/2006
WO    97/30526 A1    8/1997

OTHER PUBLICATIONS

Search Report dated Mar. 30, 2010 from the European Patent Office in counterpart application No. 07793676.3.
(Continued)

*Primary Examiner* — Andrew Chriss
*Assistant Examiner* — Abdelnabi Musa
(74) *Attorney, Agent, or Firm* — Sughrue Mion, PLLC

(57) ABSTRACT

A wireless communication method and device are provided. The wireless communication method includes: generating a bandwidth request packet requesting an allocation of a channel time from a coordinator of a wireless network; and wirelessly transmitting the bandwidth-request packet, wherein the bandwidth request packet includes information regarding a data output mode to be utilized at the channel time.

17 Claims, 6 Drawing Sheets

(51) Int. Cl.
*H04W 72/04* (2009.01)
*H04L 29/06* (2006.01)
*H04W 28/18* (2009.01)
*H04W 76/02* (2009.01)
*H04W 84/18* (2009.01)

(52) U.S. Cl.
CPC ....... *H04L 2012/2849* (2013.01); *H04W 28/18* (2013.01); *H04W 76/02* (2013.01); *H04W 84/18* (2013.01)

(56) References Cited

U.S. PATENT DOCUMENTS

| | | | |
|---|---|---|---|
| 7,088,702 B2 * | 8/2006 | Shvodian | 370/348 |
| 2002/0196803 A1 * | 12/2002 | Ota | 370/442 |
| 2004/0137907 A1 | 7/2004 | Kim | |
| 2005/0002362 A1 | 1/2005 | Kim et al. | |
| 2005/0141451 A1 * | 6/2005 | Yoon et al. | 370/329 |
| 2005/0259617 A1 | 11/2005 | Wason et al. | |
| 2007/0002743 A1 * | 1/2007 | Fan | 370/235 |
| 2007/0248072 A1 * | 10/2007 | Kwon et al. | 370/345 |
| 2008/0240146 A1 * | 10/2008 | Singh et al. | 370/458 |
| 2009/0310574 A1 * | 12/2009 | Jeon et al. | 370/336 |
| 2010/0058406 A1 * | 3/2010 | Xu et al. | 725/97 |

OTHER PUBLICATIONS

Communication issued on Nov. 17, 2011 by the European Patent Office in the counterpart European Patent Application No. 07793676.3.

Communication dated Apr. 11, 2013, issued by the European Patent Office in counterpart European Application No. 07793676.3.

Communication issued on Jul. 26, 2012 by the European Patent Office in counterpart European Patent Application No. 07793676.3.

Communication dated Aug. 26, 2013, issued by the Korean Intellectual Property Office in counterpart Korean Application No. 10-2007-0084001.

* cited by examiner

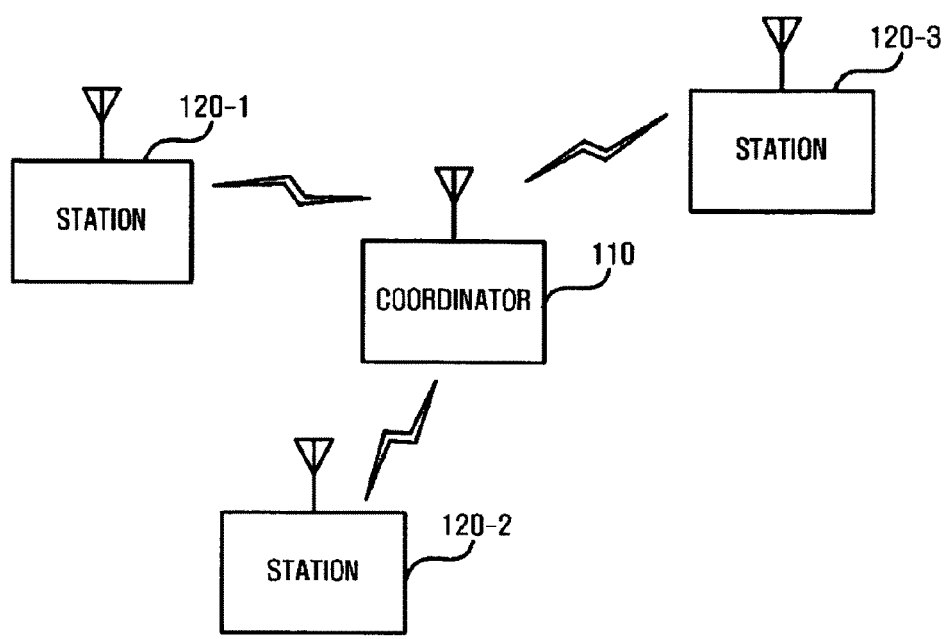
Fig. 1
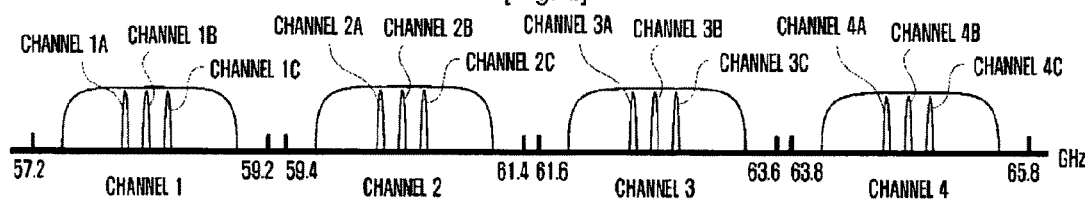
[Fig. 2]

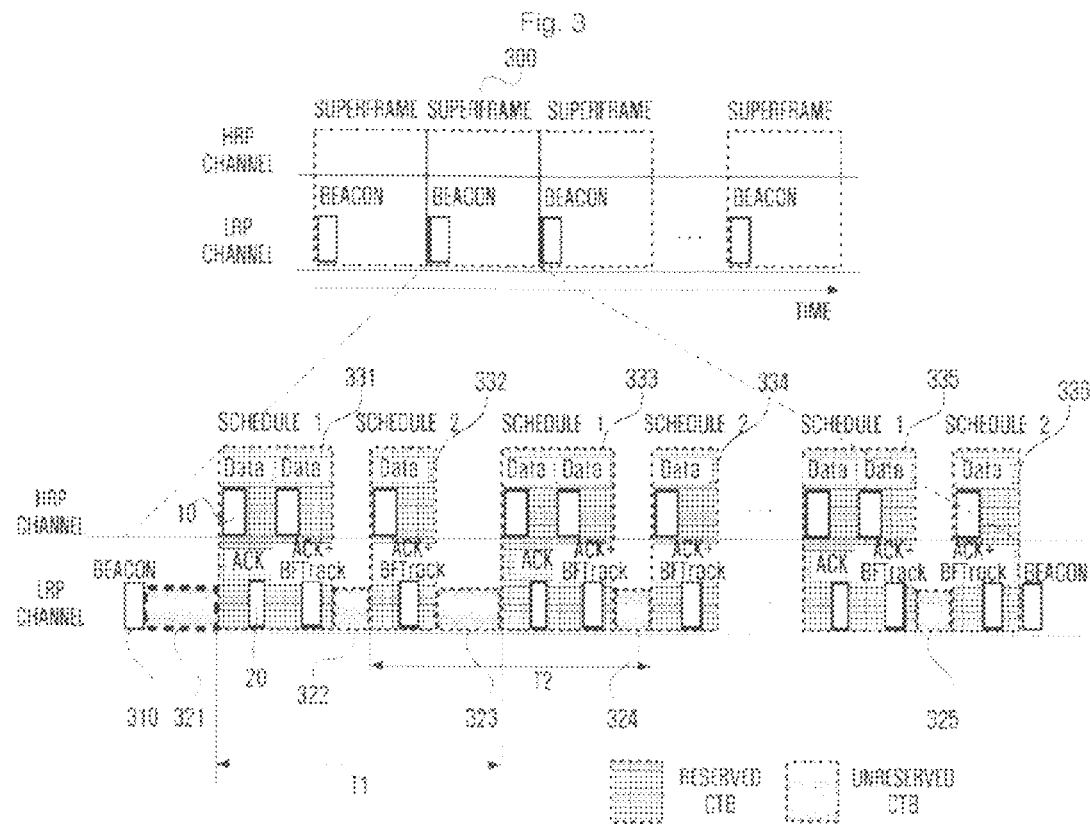
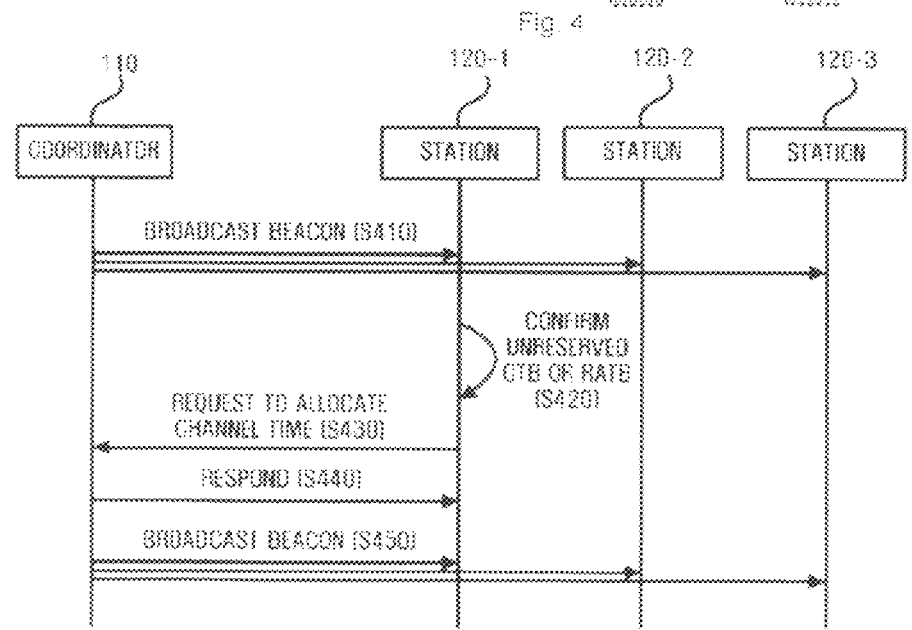

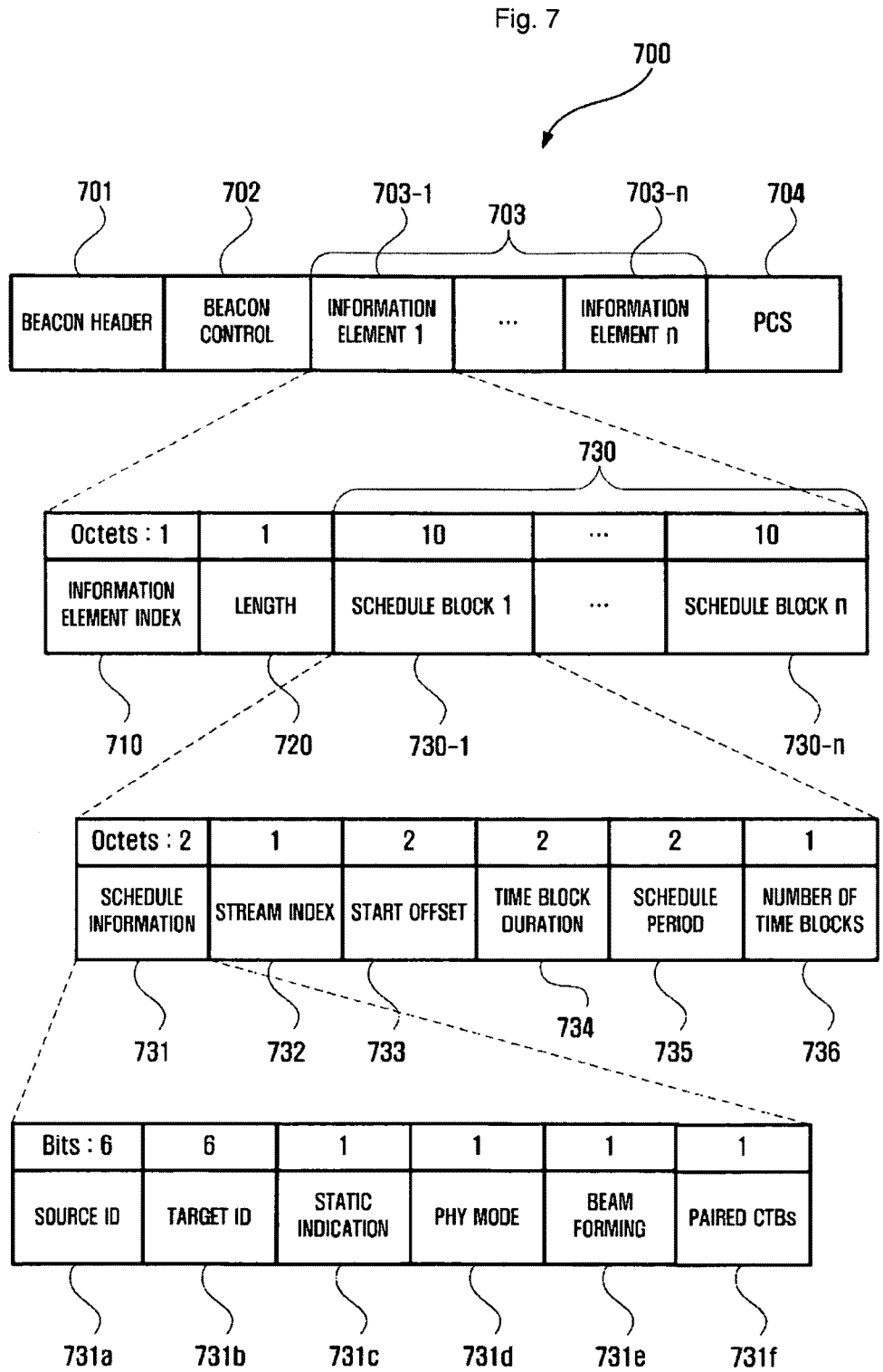

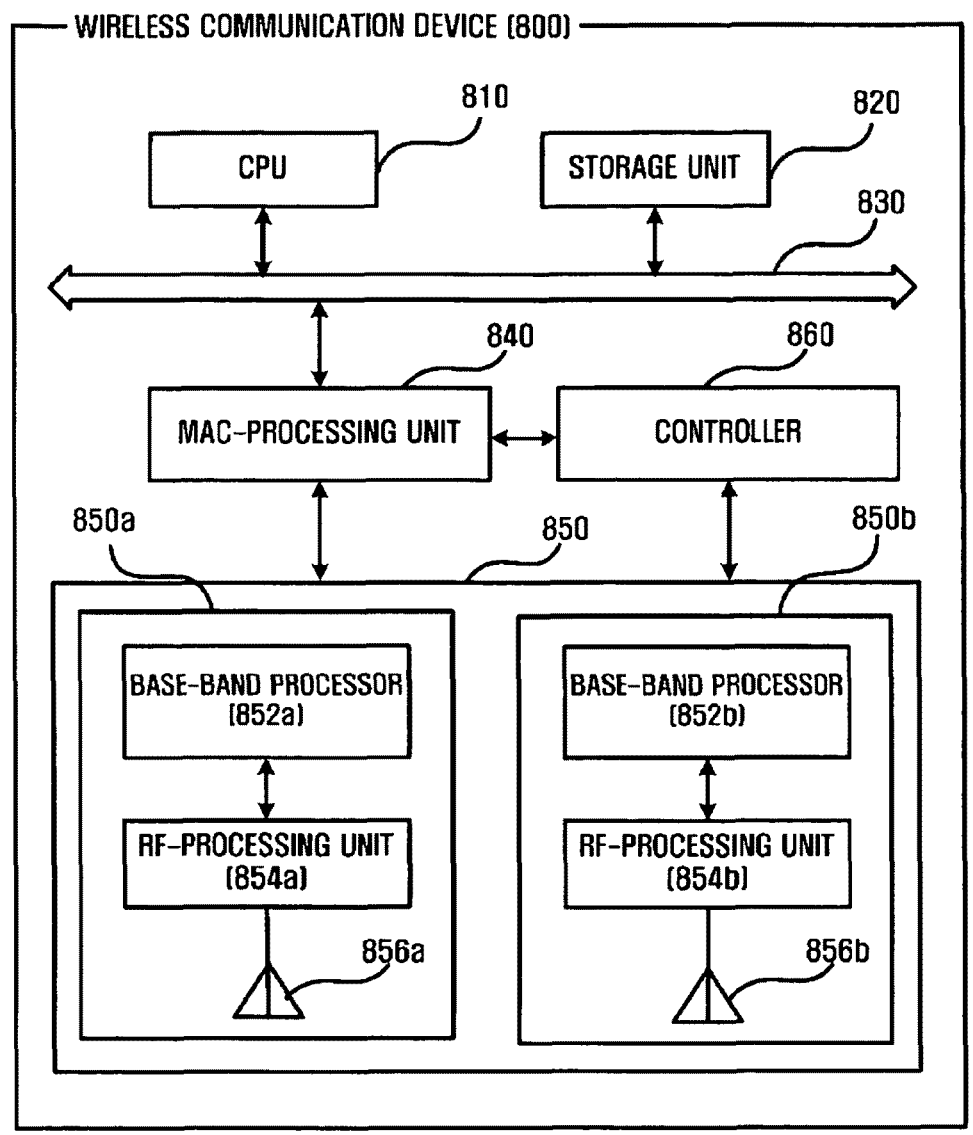

METHOD AND APPARATUS FOR WIRELESS COMMUNICATION USING BANDWIDTH-REQUEST PACKET

TECHNICAL FIELD

Devices and methods consistent with the present invention relate to wireless communication, and, in particular, to a wireless communication method and device that can allow better data transmission between wireless communication devices.

BACKGROUND ART

With the advent of wireless networks and increased demand for multimedia-data transmission, there is an increasing need for studies on effective transmission. Furthermore, the need to transmit high-quality video, such as digital versatile disk (DVD) images and high definition television (HDTV) images, between various home devices in a wireless manner is increasing.

Currently, technology standardization for transmitting large amounts of data in a wireless home network is in progress by a task group of IEEE 802.15.3c. This standard, called "mmWave" (Millimeter Wave), uses electromagnetic waves having millimeter wavelengths (that is, in the range of 30 to 300 GHz) for transmission of data. This frequency band is an unlicensed band used for telecommunication, radio astronomy, and vehicle-collision prevention.

The carrier frequency of IEEE 802.11b and IEEE 802.11g is 2.4 GHz, and the channel bandwidth is approximately 20 MHz. Further, the carrier frequency of IEEE 802.11a and IEEE 802.11n is 5 GHz, and the channel bandwidth is approximately 20 MHz. In contrast, mmWave uses a carrier frequency of 60 GHz, and has a channel bandwidth of around 0.5 to 2.5 GHz. Hence, mmWave has much higher frequencies and channel bandwidths than the conventional IEEE 802.11 line standards. Likewise, by using high-frequency signals having millimeter wavelengths, a very high transmission rate of several Gbps units can be realized, and the size of an antenna can be made less than 1.5 mm, thereby implementing a single chip that includes an antenna.

DISCLOSURE OF INVENTION

Technical Problem

The present invention provides a wireless communication method and device that can allow better data transmission.

Objects of the invention are not limited to those mentioned above, and other objects of the invention will be understood by those skilled in the art through the following description.

Technical Solution

According to an aspect of the invention, there is provided a wireless communication method, the wireless communication method including generating a bandwidth-request packet to request a coordinator of a wireless network to allocate a channel time, and outputting the generated bandwidth-request packet in a wireless manner. The bandwidth-request packet includes information on a data-output mode to be used at the channel time.

According to another aspect of the invention, there is provided a wireless communication device, the wireless communication device including a medium access control (MAC)-processing unit generating a bandwidth-request packet to request a coordinator of a wireless network to allocate a channel time, and a transceiver outputting the generated bandwidth-request packet in a wireless manner. The bandwidth-request packet includes information on a data-output mode to be used at the channel time.

BRIEF DESCRIPTION OF THE DRAWINGS

The above and other aspects of the invention will become apparent by describing in detail exemplary embodiments thereof with reference to the attached drawings in which FIG. 1 is a diagram showing a wireless network according to an exemplary embodiment of the invention.

FIG. 2 is a diagram showing frequency bands of an HRP channel and an LRP channel according to an exemplary embodiment of the invention.

FIG. 3 is a diagram showing the communication timing according to an exemplary embodiment of the invention.

FIG. 4 is a flowchart showing a channel-time-allocation process according to an exemplary embodiment of the invention.

FIG. 7 is a beacon packet according to an exemplary embodiment of the invention.

FIG. 8 is a block diagram showing a wireless communication device according to an exemplary embodiment of the invention.

MODE FOR THE INVENTION

Figure 5:
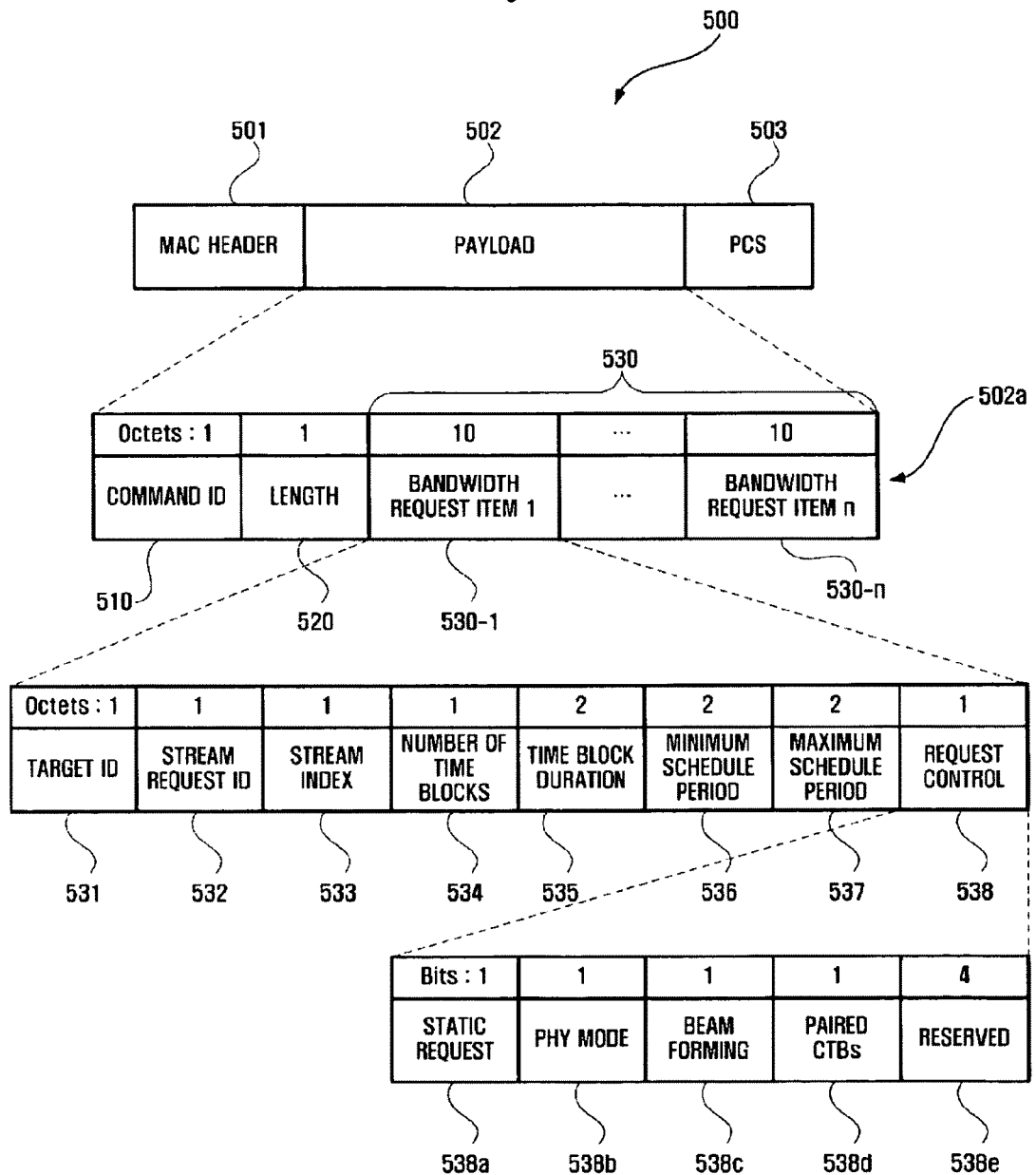
FIG. 5 is a diagram showing a bandwidth-request packet according to an exemplary embodiment of the invention.

Hereinafter, exemplary embodiments of the invention will be described in detail with reference to the accompanying drawings.

FIG. 1 is a diagram showing a wireless network 100 according to an exemplary embodiment of the invention. The wireless network 100 may be a Wireless Video Area Network (WVAN) that can support various applications for fast transmission of audio and/or video (AV) data. The AV data to be transmitted through the WVAN may be compressed or uncompressed. For example, the AV data includes uncompressed 1080p AV, uncompressed 1080i AV, MPEG-2 compressed 1080p AV, uncompressed 5.1 surround sound audio, and the like.

The wireless network 100 shown in FIG. 1 includes a coordinator 110 and stations 120-1, 120-2, and 120-3 (hereinafter, collectively represented by reference numeral "120"). Of these, the coordinator 110 may be a sink device, such as a flat display, for example, a liquid crystal display (LCD), a plasma display panel, or a digital lighting processing (DLP) projector, a Blue-ray disc (BD) recorder, a high definition (HD)-DVD recorder, or a personal video recorder (PVR). Further, the station 120 may be a source device, such as a set-top box, a BD player, a BD recorder, an HD-DVD player, an HD-DVD recorder, a PVR, an HD broadcast receiver, or the like. The invention is not limited thereto, and the coordinator 110 and the stations 120 may be implemented by different types of devices. Further, the coordinator 110 may be a source device or the stations 120 may be a sink devices. A single device may function as a source device and a sink device.

The devices 110 and 120 of the wireless network 100 may use both a broadband signal and a narrow-band signal. Here, examples of the broadband signal include a wireless signal to be used in the mmWave system, and examples of the narrow-band signal include a wireless signal to be used in the IEEE 802.11 system. For the use of the broadband signal and the narrow-band signal, the devices 110 and 120 support two physical (PHY) layers, that is, a high-rate PHY (HRP) layer and a low-rate PHY (LRP) layer. In the wireless network 100, a device that only supports the LRP layer may exist according to physical capabilities.

The HRP layer can be used for the high-rate transmission of data (for example, uncompressed AV data). Preferably, but not necessarily, the HRP can support an output of several Gbps. The HRP can be used in an adaptive antenna technology in order to adjust the output direction or the receiving direction for wireless signals. Here, the wireless signals output by the HRP layer are directional. Hence, the HRP can be used for unicasts. Because high-rate transmission is possible with HRP layers, it is preferable, but not necessary, that the HRP layer be used to transmit isochronous data such as uncompressed AV data. However, the invention is not limited to such use, and the HRP layer can also be used to transmit asynchronous data, an MAC command, antenna-steering information, and upper-layer control data for AV devices.

The LRP layer is used for low-rate data transmission. For example, the LRP layer may provide a two-way link at a rate in the range of several to tens of Mbps. Since a wireless signal that is output from the LRP layer is approximately omni-directional, the LRP layer is used for broadcasts as well as unicasts. The LRP layer is used to transmit low-rate isochronous data, such as audio, low-rate asynchronous data, an MAC command including a beacon, an acknowledgment to an HRP packet, antenna-steering information or beam-forming information, capabilities information, and upper-layer control data for AV devices.

Preferably, but not necessarily, a communication channel used by the HRP (hereinafter, referred to as "HRP channel") has a wider bandwidth than that of a communication channel used by the LRP layer (hereinafter, referred to as "LRP channel"). Here, each HRP channel can correspond to one or more LRP channels. Preferably, but not necessarily, the frequency band of the LRP channel corresponding to the HRP channel exists within the frequency band of the HRP channel.

FIG. 2 is a diagram showing frequency bands of an HRP channel and an LRP channel according to an exemplary embodiment of the invention. Four HRP channels (channels 1 to 4) are presented in the illustrated frequency band, and the corresponding three LRP channels (channels 1A-1C, channels 2A-2C, channels 3A-3C, and channels 4A-4C) exist within the frequency band of each HRP channel. The HRP channel has a bandwidth of about 2 GHz, and the mean frequency is around 60 GHz±several GHz. An example of specific frequency bands of HRP channels illustrated in FIG. 2 is shown in Table 1.

TABLE 1

An example of specific frequency bands of HRP channels

| HRP Channel Index | Initial Frequency (GHz) | Mean Frequency (GHz) | Terminal Frequency (GHz) |
|---|---|---|---|
| 1 | 57.608 GHz | 58.608 GHz | 59.608 GHz |
| 2 | 59.720 GHz | 60.720 GHz | 61.720 GHz |
| 3 | 61.832 GHz | 62.832 GHz | 63.832 GHz |
| 4 | 63.944 GHz | 64.944 GHz | 65.944 GHz |

In Table 1, each HRP channel has the bandwidth of 2 GHz. Further, an example of specific frequency bands of LRP channels corresponding to each HRP channel is shown in Table 2.

TABLE 2

An example of specific frequency bands of LRP channels

| LRP Channel Index | Initial Frequency (MHz) | Mean Frequency (MHz) | Terminal Frequency (MHz) |
|---|---|---|---|
| A | $f_{c(HRP)} - 203$ MHz | $f_{c(HRP)} - 156.75$ MHz | $f_{c(HRP)} - 110.5$ MHz |
| B | $f_{c(HRP)} - 46.25$ MHz | $f_{c(HRP)}$ MHz | $f_{c(HRP)} + 46.25$ MHz |
| C | $f_{c(HRP)} + 110.5$ MHz | $f_{c(HRP)} + 156.75$ MHz | $f_{c(HRP)} + 203$ MHz |

In Table 2, $f_{c(HRP)}$ is the mean frequency of the corresponding HRP channel, and each LRP channel has the bandwidth of 92.5 MHz. The frequency bands illustrated in Tables 1 and 2 are merely exemplary, and the invention is not limited to the frequency bands. Hence, the HRP and the LRP layer can use different mean frequencies and bandwidths.

As described above, the HRP and LRP layers may be operated in the overlapped frequency band. Here, the use of channels can be coordinated by the MAC in the time division multiple access (TDMA) method. Further, in FIG. 2 and Tables 1 and 2, four HRP channels and three LRP channels corresponding to each HRP channel (a total of 12 LRP channels), but this is merely exemplary, and thus the number of HRP channels that can be supported by the device, and the number of LRP channels corresponding to the HRP channels can be changed.

Referring to FIG. 1, the existence of the wireless network 100 is not affected by the number of stations 120-1, 120-2, and 120-3. Hence, none, or one or more stations 120-1, 120-2, and 120-3 can exist in the wireless network 100. Instead of having the coordinator 110, one of the stations 120-1, 120-2, and 120-3 can function as a coordinator depending on the capabilities of the one of the stations 120-1, 120-2, and 120-3, and the device having the capabilities to function as the coordinator is called a coordinator-capable device. When the coordinator-capable device wants to form a new wireless network, the device can select one of a plurality of HRP channels and one of a plurality of corresponding LRP channels, respectively. When the HRP channel and the LRP layer channel are selected, the coordinator-capable device can start a new wireless network by transmitting a beacon packet (hereinafter, simply referred to as "beacon") for the management of the wireless network. The coordinator-capable device that has started a new wireless network becomes a coordinator as coordinator 110 by transmitting a beacon.

The coordinator 110 regulates the communication timing in the wireless network using the beacon, and the stations 120-1, 120-2, and 120-3, communicate according to the communication timing regulated by the regulator 110. An example of the communication timing managed by the coordinator is shown in FIG. 3. Such a communication timing is called a superframe. The superframe 300 may include a beacon period 310 and at least one channel time block (CTB), i.e., CTBs 321, 322, 323, 324, 325, 331, 332, 333, 334, 335, and 336. The present invention is not limited thereto, and the superframe 300 may not include the CTB.

The beacon period 310 indicates the time when the beacon was transmitted. The beacon includes channel-time-allocation information, and is broadcast to the wireless network by the coordinator 110. Hence, a station 120-1 receives the beacon transmitted by the coordinator, and thus can know the communication timing.

The CTBs 321, 322, 323, 324, and 325, and CTBs 331, 332, 333, 334, 335, and 336 indicate the start sections when a device can occupy the medium, that is, the channel time. According to an exemplary embodiment of the invention, CTBs 321, 322, 323, 324, and 325, and 331, 332, 333, 334, 335, and 336 can be divided into a reserved CTBs 331, 332, 333, 334, 335, and 336 (hereinafter, collectively represented by reference numeral "330"), and an unreserved CTBs 321, 322, 323, 324, and 325 (hereinafter, collectively represented by reference numeral "320").

The reserved CTB 330 is a channel time allocated to a certain station of the stations 120-1, 120-2, and 120-3, for example, the station 120-1, by the coordinator 110. The coordinator 110 can also allocate a channel time for itself. Hence, the coordinator 110 and the station 120-1 may occupy the medium in an uncompetitive way at the reserved CTB 330.

The reserved CTB 330 is used for data transmission using the HRP channel. An acknowledgement 20 by the receiver of data 10 transmitted using the HRP channel is preferably transmitted through the LRP channel. Further, according to an exemplary embodiment of the invention, a reserved CTB for communication through the LRP channel may exist. Accordingly, the reserved CTB 330 is used for data transmission through the HRP channel or data transmission through the LRP channel. For example, the devices 110 and 120 may transmit/receive uncompressed AV data through the HRP channel, or may transmit/receive an acknowledgement to HRP data, various kinds of commands, and other data through the LRP channel at the reserved CTB 330 allocated for them.

Herein, a collection of associated reserved CTBs is referred to as "schedule". That is, the schedule represents a single reserved CTB or a collection of a plurality of cyclic reserved CTBs. When the schedule includes a plurality of reserved CTBs, the plurality of reserved CTBs may be the channel time allocated to the same device. Referring to FIG. 3, two schedules are presented in the superframe 300. Schedule 1 includes the reserved CTBs 331, 333, and 335, and schedule 2 includes the reserved CTBs 332, 334, and 336.

The unreserved CTB 320 is the remaining time periods not including the channel time allocated to the coordinator 110 and the stations 120-1, 120-2, and 120-3 by the coordinator 110. The coordinator 110 and the station 120-1 can competitively occupy the medium in the unreserved CTB 320. The unreserved CTB 320 can be used for the transmission that uses the LRP layer channel. Hence, the coordinator 110 and the stations 120-1, 120-2, and 120-3 can transmit various MAC commands or control packets using the LRP layer channel in the unreserved CTB 320. For example, a station 120-1 can request the channel-time allocation from the coordinator 110 after occupying the medium in one of the unreserved CTB 320. Some examples of the contention-based medium-access mechanism that can be used in the unreserved CTB 320 are the carrier sense multiple access (CSMA) method and the slotted Aloha method. However, the invention is not limited to such methods, and other types of contention-based medium-access mechanisms can be used in the unreserved CTB 320.

Though not shown in FIG. 3, according to an exemplary embodiment of the invention, the superframe 300 may include at least one random access time block (RATB). The RATB is used when the station 120 transmits an MAC command to the coordinator 110 or other stations, or when an association process, through which a new station joins in the wireless network 100, occurs. In the RATB, like the unreserved CTB 320, the stations 120 may competitively occupy the wireless medium.

FIG. 4 is a flowchart illustrating a channel-time-allocation process according to an exemplary embodiment of the invention.

The coordinator 110 broadcasts a beacon (S410) which is received by the station 120-1. The station 120-1 then confirms the unreserved CTB 320 or the RATB through the received beacon (S420).

The station 120-1 competitively occupies the medium in the unreserved CTB 320 or the RATB, and then requests the coordinator 100 to allocate a channel time (S430). When requesting to allocate a channel time, the station 120-1 determines a PHY mode to use, and transmits information on the determined PHY mode to the coordinator 110. What PHY mode is to be used may be determined according to the type of data to be transmitted by the station 120-1 at the channel time allocated to it. According to an exemplary embodiment of the invention, the PHY mode may be divided into an HRP mode, during which data is transmitted using the HRP layer, and an LRP mode, during which data is transmitted using the LRP layer. That is, it can be understood that the PHY mode is a data-output mode indicating which of the HRP channel and the LRP channel data is transmitted through.

The coordinator 110 that is requested to allocate a channel time by the station 120-1 determines whether there is a communication bandwidth to spare. To this end, a network environment, a usable channel time in the wireless network, and a reserved channel time may be taken into account.

If there is communication bandwidth to spare, the coordinator 110 allocates the channel time to the station 120-1, and transmits a response reporting that the channel time is allocated (S440).

Subsequently, the coordinator 110 adds information on the channel time allocated to the station 120-1 to a next beacon, and broadcasts the beacon to the wireless network 100 (S450). The beacon may include information on the PHY mode to be used in the station 120-1. Accordingly, a target device that receives data transmitted from the station 120-1 at the channel time allocated to the station 120-1 is arranged to receive data using a predetermined PHY mode. Further, at the allocated channel time, the station 120-1 occupies the wireless medium in an uncompetitive way to transmit data. The PHY mode that is used in the station 120-1 for data transmission is the same as the PHY mode determined when channel time allocation is requested.

On the other hand, if there is no communication bandwidth to spare, the coordinator 110 transmits, to the station 120-1, a response that the channel time cannot be allocated (S440). In this case, the station 120-1 competitively occupies the medium at a remaining unreserved CTB or RATB of the current superframe, or in an unreserved CTB 320 or RATB of a next superframe, and then requests the coordinator 110 to allocate a channel time again.

FIG. 5 is a diagram showing a bandwidth-request packet 500 according to an exemplary embodiment of the invention.

The bandwidth-request packet 500 is used when the station 120-1 requests the coordinator 110 to allocate a channel time in operation S430 shown in FIG. 4. The invention is not limited thereto; for example, the bandwidth-request packet 500 may be used to modify or terminate the allocated channel time.

The bandwidth-request packet 500 includes an MAC header 501, a payload 502, and a Packet Check Sequence (PCS) field 503.

The MAC header 501 includes information required for normal transmission of the bandwidth-request packet 500. For example, the MAC header 501 may include an address of a device (station) that transmits the bandwidth-request packet 500, an address of a device (coordinator) that receives the bandwidth-request packet 500, an identifier of the wireless network 100, an acknowledgement (Ack) policy, and a protocol version.

In the PCS field 503, a cyclic redundancy check (CRC) value for the payload 502 is set.

The payload 502 may include a bandwidth-request command 502a. The bandwidth-request command 502a includes a command identifier (ID) field 510, a length field 520, and at least one bandwidth request item field 530.

The command ID field 510 includes an identifier (command ID) for identifying that an MAC command in the payload 502 is the bandwidth-request command 502a. The length field 520 indicates the length of the bandwidth-request command 502a.

The bandwidth request item field 530-1 includes a target ID field 531, a stream request ID field 532, a stream index field 533, a number-of-time-blocks field 534, a time-block-duration field 535, a minimum-schedule-period field 536, a maximum schedule period 537, and a request-control field 538. Other bandwidth request item fields 530-n also have the same structure.

The target ID field 531 includes an identifier of the target device that receives data transmitted by the station 120-1 at the channel time allocated to the station 120-1.

The stream request ID field 532 includes an identifier (stream request ID) that is used to uniquely identify the request from the station 120-1 before the station 120-1 receives a stream index from the coordinator 110. If the bandwidth request item 530-1 is used to request to allocate a channel time to transmit a new isochronous stream, the stream request ID field 532 is set to a stream request ID (not zero) generated by the station. If the bandwidth request item 530-1 is used to modify or terminate the allocated channel time, or if the bandwidth request item 530-1 is used to request to allocate a channel time to transmit an asynchronous stream, the stream request ID field 532 is set to 0 (zero). When the stream request ID field 532 is set to 0, the reception side (coordinator) may disregard this field.

The stream index field 533 includes a stream index allocated by the coordinator. Here, the stream index indicates an identifier for identifying data to be transmitted by the station 120-1.

The number-of-time-blocks field 534 includes the number of time blocks requested by the station 120-1. When a channel time to transmit isochronous data is requested, a value that is set in the number-of-time-blocks field 534 represents the number of time blocks requested by the station 120-1 for every superframe. When a channel time to transmit asynchronous data is requested, a value that is set in the number-of-time-blocks field 534 represents the total number of time blocks requested by the station 120-1.

The time-block-duration field 535 represents the time length of time blocks requested by the station 120-1.

The minimum-schedule-period field 536 includes an allowable minimum value for a difference between start times of two successive time blocks.

When a channel time to transmit isochronous data is requested, the maximum schedule-period field 537 includes an allowable maximum value for a difference between start times of two successive time blocks. When a channel time to transmit asynchronous data is requested, the maximum schedule-period field 537 represents the start time of a first reserved CTB that is to be allocated to the station 120-1. Here, the start time is set to a time difference from a time when the superframe starts until the first CTB starts. In the case where the channel time to transmit asynchronous data is requested, if the maximum schedule-period field 537 is set to 0 (zero), it may mean that the reserved CTB to be allocated to the station 120-1 does not need to be located at a specific point of time.

The values that are set in the minimum-schedule-period field 536 and the maximum schedule-period field 537 are determined according to the type or a degree of importance of data to be transmitted by the station 120-1, and the capability of the station 120-1.

The request-control field 538 includes a static request field 538a, a PHY-mode field 538b, a beam-forming field 538c, a paired-CTBs field 538d, and a reserved field 538e.

The static request field 538a includes information on whether the station 120-1 requests a static channel time or a dynamic channel time. The static channel time is a channel time that is repetitively present at the same positions of a plurality of superframes. The dynamic channel time is a channel time that is not fixedly located in a superframe, unlike the static channel time. For example, the station 120-1 requests the static channel time to transmit isochronous data and requests the dynamic channel time to transmit asynchronous data. According to an exemplary embodiment of the invention, when the station 120-1 requests the static channel time, the static request field 538a is set to "1". When the station 120-1 requests the dynamic channel time, the static request field 538a is set to "0".

The PHY-mode field 538b includes information the PHY mode to be used in the station 120-1. According to an exemplary embodiment of the invention, when the station 120-1 requests a channel time to use the HRP channel, the PHY-mode field 538b is set to "1". When the station 120-1 requests a channel time to use the LRP channel, the PHY-mode field 538b is set to "0".

The beam-forming field 538c includes information on whether the station 120-1 transmits data using a beam-forming method. For example, when the station 120-1 requests a channel time to transmit data using the beam-forming method, the beam-forming field 538c is set to "1". Otherwise, the beam-forming field 538c is set to "0". The fact that the beam-forming method is used means that a signal to be transmitted has directionality.

The paired-CTBs field 538d includes information on whether the station 120-1 requests to allocate paired CTBs. Although a single schedule includes CTBs allocated to a single station, when the paired CTBs are allocated, the CTBs in the single schedule may be used for a plurality of stations. For example, in the case of the schedule including the paired CTBs, a first station occupies the wireless medium to transmit data in the first CTB, and a second station occupies the wireless medium to transmit data in the second CTB. According to an exemplary embodiment of the invention, when a request to allocate a channel time from the station 120-1 is a request to allocate paired CTBs, the paired-CTBs field 538d is set to "1". Otherwise, the paired-CTBs field 538d is set to "0".

Figure 6:
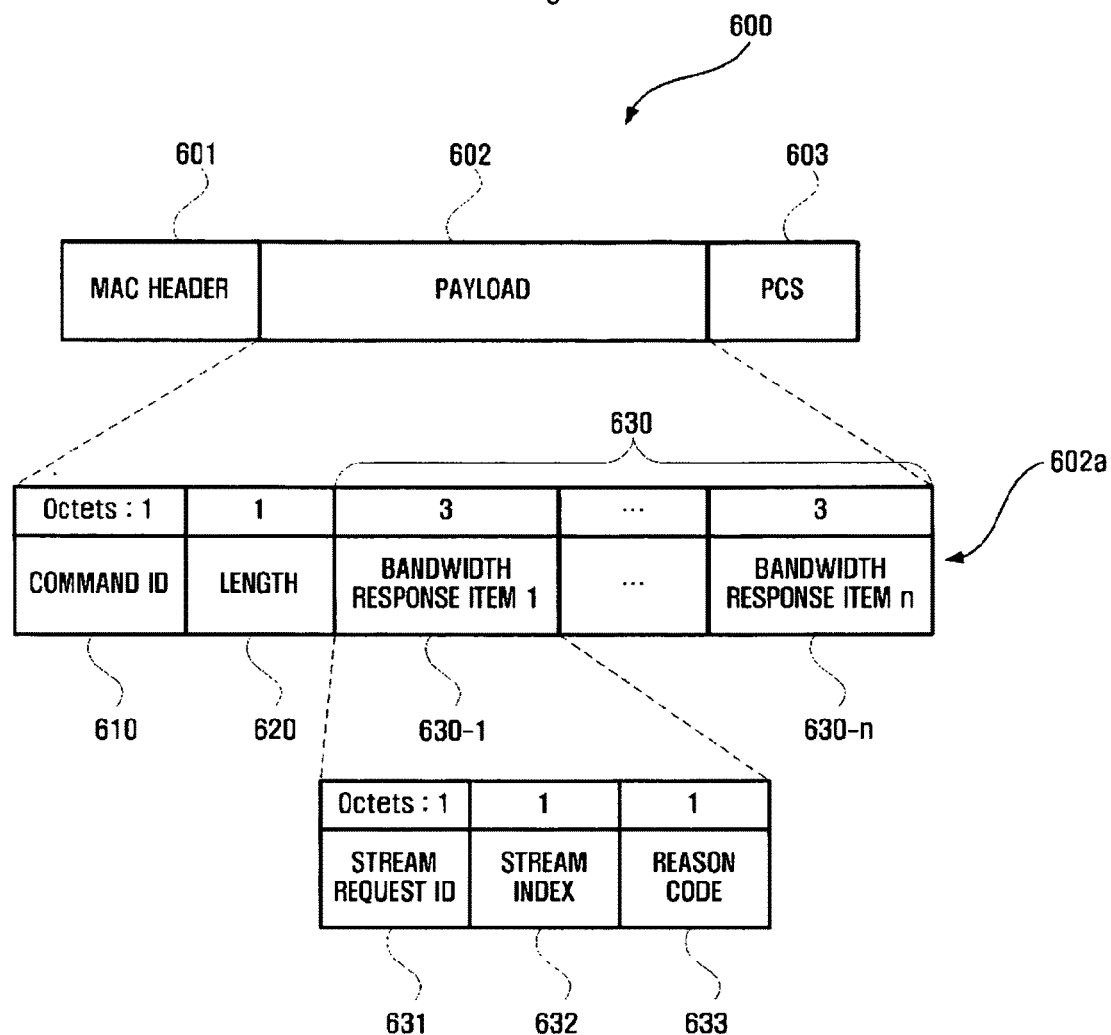
FIG. 6 is a diagram showing a bandwidth-response packet according to an exemplary embodiment of the invention.

FIG. 6 is a diagram showing a bandwidth-response packet 600 according to an exemplary embodiment of the invention. The bandwidth-response packet 600 is used when the coordinator 110 responds to the request to allocate a channel time from the station 120-1 in operation S440 shown in FIG. 4. The invention is not limited thereto; for example, when the station 120-1 requests to modify or terminate the allocated channel time, the bandwidth-response packet 600 may be used to respond to the request. That is, the bandwidth-response packet 600 corresponds to the bandwidth-request packet 500 shown in FIG. 5.

The bandwidth-response packet 600 includes an MAC header 601, a payload 602, and a PCS field 603.

The MAC header 601 includes information required for normal transmission of the bandwidth-response packet 600. For example, the MAC header 601 includes an address of a device (coordinator) that transmits the bandwidth-response packet 600, an address of a device (station) that receives the bandwidth-response packet 600, an identifier of the wireless network 100, an Ack policy, and a protocol version.

In the PCS field 603, a CRC value for the payload 602 is set.

The payload 602 includes a bandwidth-response command 602a. The bandwidth-response command 602a includes a command ID field 610, a length field 620, and at least one bandwidth response item field 630.

The command ID field 610 includes an identifier (command ID) for identifying that an MAC command in the payload 602 is the bandwidth-response command 602a. The length field 620 represents the length of the bandwidth-response command 602a.

The bandwidth response item field 630-1 includes a stream request ID field 631, a stream index field 632, and a reason code field 633. Other bandwidth response item fields 630-n also have the same structure.

The stream request ID field 631 and the stream index field 632 include information corresponding to the stream request ID field 532 and the stream index field 533 of the bandwidth-request packet 500 shown in FIG. 5.

The reason code field 633 includes information (reason code) on whether the bandwidth request from the station 120-1 is accepted. Here, the bandwidth request includes a request to modify or terminate an allocated channel time, as well as a request to allocate a channel time. According to an exemplary embodiment of the invention, reason code values are as shown in Table 3.

TABLE 3

| Code Value | Content |
|---|---|
| 0x00 | Channel Time Allocated |
| 0x01 | Channel Time Allocation Failure - No Bandwidth to Spare |
| 0x02 | Channel Time Allocation Failure - Handover |
| 0x03 | Channel Time Allocation Failure - Wireless Network Disconnected |
| 0x04 | Channel Time Allocation Failure - Channel Changed |
| 0x05 | Channel Time Correction Failure |
| 0x06 | Channel Time Termination by Coordinator Because ATP of Source Station Elapses |
| 0x07 | Channel Time Termination by Coordinator Because ATP of Target Station Elapses |
| 0x08 | Channel Time Termination by Coordinator Because Bandwidth Request does not resume |
| 0x09 | Channel Time Termination by Coordinator due to Handover |
| 0x0A | Channel Time Termination by Target Station |
| 0x0B-0xFE | Reserved |
| 0xFF | Different Type of Failure |

In Table 3, the Association Time Period (ATP) represents the maximum time at which the coordinator and the station are kept connected to each other without communication. Accordingly, if communication is not performed between the coordinator and the station until the ATP elapses, the coordinator and the station are disconnected from each other.

FIG. 7 is a diagram showing a beacon packet 700 according to an exemplary embodiment of the invention. The beacon packet 700 is a management packet that broadcasts to the wireless network 100 by the coordinator 110, like operations S410 and S450 shown in FIG. 4. The beacon packet 700 includes a beacon header 701, a beacon control field 702, at least one information element field 703, and a PCS field 704.

The beacon control field 701 includes a beacon transmission cycle, the number of a superframe to be managed through the beacon packet 700, and information on whether a communication bandwidth to be allocated to the station 120 remains.

The PCS field 704 includes a CRC value for a payload of the beacon packet 700 including the beacon control field 702 and at least one information element field 703.

One of the information elements 703 in the beacon packet 700, preferably, the first information element 703-1 is a schedule information element including information on the communication timing. Through the schedule information element 703-1, the station 120 can know the structure (for example, reserved CTB, unreserved CTB, or RATB) of a superframe next to the superframe transmitted by the beacon packet 700. For example, a schedule information element in an N-th beacon represents the communication timing of a superframe starting with an (N+1)th beacon.

The schedule information element 703-1 includes an information element index field 710, a length field 720, and at least one schedule block field 730.

The information element index field 710 includes an identifier (information element index) for identifying a schedule information element. The length field 720 represents the total length of at least one schedule block field 730.

The schedule block field 730-1 includes a schedule information field 731, a stream index field 732, a start offset field 733, a time block duration field 734, a schedule period field 735, and a number of time blocks field 736. Other schedule block fields 730-n also have the same structure.

The schedule information field 731 includes a source ID field 731a, a target ID field 731b, a static indication field 731c, a PHY mode field 731d, a beam forming field 731e, and a paired CTBs field 731f.

The source ID field 731a and the target ID field 731b include an identifier (source ID) of a device that transmits data on a schedule corresponding to the schedule block field 730-1 and an identifier (target ID) of a device that receives the data, respectively. The identifiers of the individual devices in the wireless network 100 are allocated by the coordinator 110 when the station 120 joins the wireless network 100.

The static indication field 731c represents whether a schedule indicated by the schedule block 730-1 is a static schedule. For example, the static indication field 731c is set to "1" for the static schedule or it is set to "0" for a dynamic schedule. In case of the station that is allocated with the static schedule, it can be expected that the same reserved CTB exists in the next superframe. However, the position of the dynamic schedule varies for every superframe.

The PHY mode field 731d includes information on what PHY mode is used by the station for data transmission at each reserved CTB in the schedule indicated by the schedule block 730-1. For example, if the HRP mode is used, the PHY mode field 731d is set to "1", and if the LRP mode is used, the PHY mode field 731d is set to "0".

The beam forming field 731e includes information on whether the station transmits data at a CTB in the allocated schedule using a beam forming method. For example, if the station transmits data using the beam forming method, the beam forming field 731e is set to "1". Otherwise, the beam forming field 731e is set to "0".

The paired CTBs field 731f includes information on whether paired CTBs are allocated. For example, when the paired CTBs are allocated, the paired CTBs field 731f is set to "1". Otherwise, the paired CTBs field 731f is set to "0".

The stream index field 732 includes an identifier (stream index) for identifying data to be transmitted on the allocated schedule. For example, if the allocated schedule is used to transmit an asynchronous stream, the stream index field 732 is set to a stream index for identifying the asynchronous stream.

The start offset field 733 includes a time at which the first reserved CTB in the allocated schedule starts. The start offset field 733 is set to a time offset from a time when the beacon starts until the first reserved CTB in the allocated schedule elapses.

The time block duration field 734 represents the time length of each reserved CTB in the allocated schedule.

The schedule period field 735 represents the difference between the start times of two successive time blocks in the allocated schedule. For example, in case of the beacon including information on the superframe 400 shown in FIG. 4, a schedule period field of a schedule block field for the schedule 1 is set to time information corresponding to T1. Further, a schedule period field of a schedule block field for the schedule 2 is set to time information corresponding to T2.

The number of time blocks field 736 represents the number of time blocks included in the allocated schedule in a single superframe.

FIG. 8 is a block diagram showing a wireless communication device 800 according to an exemplary embodiment of the invention. The wireless communication device 800 may be the coordinator 110 or the station 120 shown in FIG. 1. The wireless communication device 800 includes a CPU 810, a storage unit 820, a MAC-processing unit 840, a transceiver 850, and a controller 860.

The CPU 810 controls other elements connected to a bus 830, and is in charge of handling upper layers (e.g., a logical link control (LLC) layer, a network layer, a transport layer, and an application layer) of the MAC layer of general communication layers. Hence, the CPU 810 handles the received data provided from the MAC handling data 840 or generates transport data, and then provides to the MAC-processing unit 840. For example, the data generated or handled by the CPU 810 can be uncompressed AV data.

The storage unit 820 stores the received data handled by the CPU 810 or transport data generated by the CPU 810. The storage unit 820 can be implemented as a non-volatile memory device such as a ROM, a PROM, an EPROM, an EEPROM, and a flash memory, a volatile memory device such as a RAM, and other arbitrary memories known in the concerned field.

The MAC-processing unit 840 generates packets to be transmitted to other devices or analyzes packets transmitted from other devices. For example, the MAC-processing unit 840 generates and analyzes the bandwidth-request packet 500 shown in FIG. 5, the bandwidth-response packet 600 shown in FIG. 6, and the beacon packet 700 shown in FIG. 7. To analyze the packet includes a meaning of extracting required information from the MAC packet and using the extracted information. In addition, the MAC-processing unit 840 generates data packets including uncompressed AV data, or extracts uncompressed AV data from data packets received from other devices, and transmits the extracted uncompressed AV data to the CPU 810.

The transceiver 850 transmits the packets received from the MAC-processing unit 840, or receives the packets transmitted to other devices and transmits the received packets to the MAC-processing unit 840. The transceiver 850 includes a first physical-processing unit 850a and a second physical-processing unit 850b. Of these, the first physical-processing unit 850a is implemented by the HRP layer, and the second physical-processing unit 850b is implemented by the LRP layer. That is, the first physical-processing unit 850a transmits/receives data using the broadband signal, and the second physical-processing unit 850b transmits/receives data using the narrow-band signal. In the first physical-processing unit 850a and the second physical-processing unit 850b, a process of transmitting and receiving a packet may be controlled in a time-division manner by the MAC-processing unit 840.

The first physical-processing unit 850a can be divided into a base-band processor 852a that handles a base-band signal, and a radio frequency (RF)-processing unit 854a that generates a wireless signal from the handled base-band signal, and transmits the generated wireless signal through an antenna 856a.

Specifically, the base-band processor 852a executes a packet-formatting and channel-coding, and the RF-processing unit 854a executes operations such as the amplification of analogue waves, the conversion of analogue and digital signals, and the modulation. Further, it is preferable, but not necessary, for the antenna 856a to be constituted as an array antenna so as to make the beam-forming possible. The array antenna can be a form where a plurality of antenna elements are arranged in a row. However, the invention is not limited to the form. For example, the array antenna can be constituted by a plurality of antenna elements arranged in a two-dimensional matrix form, in which a more elaborate and cubic beam-forming is possible.

The second physical-processing unit 850b has a similar structure as the first physical-processing unit 850a. However, since the communication channels and the types of transmitted and received packets used by the first physical-processing unit 850a and the second physical-processing unit 850b are different from each other, the base-band-processing unit 852a and the base-band-processing unit 852b can use different channel-coding methods and different channel-coding parameters. In addition, the RF-processing unit 854a and the RF-processing unit 854b may use different modulation methods or different frequency bands.

The transceiver 850 does not always have to include both the first physical-processing unit 850a and the second physical-processing unit 850b, and only the first physical channel 850a can be included depending on the exemplary embodiment. Further, the first physical-processing unit 850a can have only one of the packet-transmitting function and the packet-receiving function using the HRP channel.

The controller 860 determines whether to use a data-transmission mode and a beam-forming method for data to be transmitted, and a physical-processing unit that transmits and receives packets, and provides information including the determination result to the MAC-processing unit 840. Of course, the information may also be transmitted to the transceiver 850. Further, the controller 860 controls the MAC-processing unit 840 to generate necessary packets (for example, an uncompressed AV data packet, a bandwidth-request packet, a bandwidth-response packet, and a beacon packet) at a predetermined time according to schedule information extracted from the beacon packet and whether data to be transmitted exists. If the wireless communication device 800 is the coordinator 110, the controller 860 may control communication timing according to the request to allocate the channel time of the station 120. The controller 860 may be implemented to be incorporated with the MAC-processing unit 840.

The elements of the wireless communication device 800 described with reference to FIG. 8 can be implemented as modules. The term "module", as used herein, includes, but is not limited to, a software or hardware component, such as a Field Programmable Gate Array (FPGA) or an Application Specific Integrated Circuit (ASIC), which performs certain tasks. A module may advantageously be configured to reside in the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although the invention has been described in connection with the exemplary embodiments of the invention, it will be apparent to those skilled in the art that various modifications and changes may be made thereto without departing from the scope and spirit of the invention. Therefore, it should be understood that the above exemplary embodiments are not limitative, but illustrative in all aspects.

INDUSTRIAL APPLICABILITY

According to the above-described wireless communication method and device of the invention, better data transmission between wireless communication devices can be achieved.

The invention claimed is:

1. A wireless communication method comprising:
   generating a bandwidth request packet requesting an allocation of a channel time from a coordinator of a wireless network; and
   wirelessly transmitting the bandwidth-request packet,
   wherein the bandwidth request packet comprises:
      information regarding a data output mode to be utilized at the channel time; information regarding whether a request to allocate paired channel time blocks of the channel time is requested, the allocation of the paired channel time blocks being that the channel time blocks in a single schedule of the channel time are used for a plurality of stations; and
      information regarding whether a static channel time, which is a channel time that is present at a same position in a plurality of superframes, or a dynamic channel time, which is a channel time that is not fixedly located in the plurality of superframes, is requested.

2. The wireless communication method of claim 1, wherein the data output mode is one of a first transmission mode, in which data is transmitted via a broadband signal, and a second transmission mode, in which the data is transmitted via a narrow band signal.

3. The wireless communication method of claim 2, wherein, if the data includes uncompressed audio or video data, the data output mode is the first transmission mode.

4. The wireless communication method of claim 1, wherein the data output mode is one of a first transmission mode that utilizes a first channel and a second transmission mode that utilizes uses a second channel, and the first channel and the second channel support different data transmission characteristics.

5. The wireless communication method of claim 4, wherein a frequency band of the first channel includes a frequency band of the second channel.

6. The wireless communication method of claim 1, wherein the bandwidth request packet further comprises information regarding whether a beam forming method is to be utilized during data transmission.

7. The wireless communication method of claim 1, wherein the plurality of stations includes a first station and a second station, and the paired channel time blocks include a first channel time block and a second channel time block, and
   in response to the request to allocate paired channel time blocks, the first channel time is allocated to the first station and the second channel time is allocated to the second station.

8. The wireless communication method of claim 7, wherein the first station transmits data during the first channel time and the second station transmits data during the second channel time.

9. The wireless communication method of claim 7, wherein the first station and the second station both wirelessly communicate with the coordinator.

10. A wireless communication device comprising:
    a medium access control (MAC) processing unit comprising means for generating a bandwidth request packet requesting a coordinator of a wireless network to allocate a channel time; and
    a transceiver comprising means for wirelessly transmits the bandwidth request packet generated by the MAC processing unit,
    wherein the bandwidth request packet comprises:
    information regarding a data output mode to be utilized at the channel time information regarding whether a request to allocate paired channel time blocks of the channel time is requested, the allocation of the paired channel time blocks being that the channel time blocks in a single schedule of the channel time are used for a plurality of stations; and
    information regarding whether a static channel time, which is a channel time that is present at a same position in a plurality of superframes, or a dynamic channel time, which is a channel time that is not fixedly located in the plurality of superframes, is requested.

11. The wireless communication device of claim 10, wherein the data output mode is one of a first transmission mode, in which data is transmitted via a broadband signal, and a second transmission mode, in which the data is transmitted via a narrow band signal.

12. The wireless communication device of claim 11, wherein the transceiver comprises:
    a first physical processing unit which is configured to operate in the first transmission mode; and
    a second physical processing unit which is configured to operate in the second transmission mode.

13. The wireless communication device of claim 11, wherein, if the data includes uncompressed audio or video data, the data output mode is the first transmission mode.

14. The wireless communication device of claim 10, wherein the data output mode is one of a first transmission mode that utilizes a first channel and a second transmission mode that utilizes a second channel, and the first channel and the second channel support different data transmission abilities.

15. The wireless communication device of claim 14, wherein the frequency band of the first channel includes the frequency band of the second channel.

16. The wireless communication device of claim 10, wherein the bandwidth request packet further comprises information regarding whether a beam forming method is to be utilized during data transmission.

17. A wireless communication method comprising:
generating a bandwidth request packet requesting an allocation of a channel time from a coordinator of a wireless network; and
wirelessly transmitting the bandwidth-request packet,
wherein the bandwidth request packet comprises a request control field that comprises: information regarding a data output mode to be utilized at the channel time;
information regarding whether a request to allocate paired channel time blocks of the channel time is requested, the allocation of the paired channel time blocks being that the channel time blocks in a single schedule of the channel time are used for a plurality of stations;
information regarding whether a static channel time, which is a channel time that is present at a same position in a plurality of superframes, or a dynamic channel time, which is a channel time that is not fixedly located in the plurality of superframes, is requested; and
information regarding whether a beam forming method is to be utilized during data transmission.

* * * * *